US011888269B2

(12) United States Patent
Sharf

(10) Patent No.: US 11,888,269 B2
(45) Date of Patent: Jan. 30, 2024

(54) RECEPTACLE CONNECTOR ASSEMBLY FOR A COMMUNICATION SYSTEM

(71) Applicant: TE Connectivity Services GmbH, Schaffhausen (CH)

(72) Inventor: Alex Michael Sharf, Harrisburg, PA (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 277 days.

(21) Appl. No.: 17/493,427

(22) Filed: Oct. 4, 2021

(65) Prior Publication Data

US 2023/0105368 A1 Apr. 6, 2023

(51) Int. Cl.

| | |
|---|---|
| ***H01R 25/00*** | (2006.01) |
| ***H01R 12/58*** | (2011.01) |
| ***H01R 13/6587*** | (2011.01) |
| *H01R 12/53* | (2011.01) |

(52) U.S. Cl.

CPC ......... *H01R 13/6587* (2013.01); *H01R 12/53* (2013.01); *H01R 12/58* (2013.01); *H01R 25/006* (2013.01)

(58) Field of Classification Search

CPC ............ H01R 13/6581; H01R 13/6585; H01R 13/6586; H01R 13/6587; H01R 12/53; H01R 12/58; H01R 25/00; H01R 25/006

USPC .................................................... 439/78, 108

See application file for complete search history.

(56) References Cited

U.S. PATENT DOCUMENTS

| | | | | |
|---|---|---|---|---|
| 8,747,159 B2 * | 6/2014 | Liu | G02B 6/4261 | 439/607.2 |
| 8,890,004 B2 * | 11/2014 | Wickes | H05K 9/0009 | 174/382 |
| 11,621,530 B2 * | 4/2023 | Lloyd | H01R 13/6583 | 439/607.2 |
| 11,637,390 B2 * | 4/2023 | Zerebilov | H01R 13/502 | 439/607.2 |
| 11,650,383 B2 * | 5/2023 | Zbinden | G02B 6/4268 | 439/607.2 |

* cited by examiner

*Primary Examiner* — Khiem M Nguyen

(57) ABSTRACT

A receptacle connector assembly includes a receptacle cage having cage walls defining first, second, and third module channels in a stacked arrangement. The cage walls include a top wall, a first side wall, a second side wall, a first separator panel, and a second separator panel. The first and second side wall extend along opposite sides of the first, second and third module channels. The first separator panel is located between the first and second module channels. The second separator panel is located between the second and third module channels. The receptacle connector assembly includes a first receptacle module in the first module channel for mating with a first plug module, a second receptacle module in the second module channel for mating with a second plug module, and a third receptacle module in the third module channel for mating with a third plug module.

24 Claims, 9 Drawing Sheets

RECEPTACLE CONNECTOR ASSEMBLY FOR A COMMUNICATION SYSTEM

BACKGROUND OF THE INVENTION

The subject matter herein relates generally to communication systems.

Some communication systems utilize transceivers or plug modules as I/O modules for data communication. The plug module is pluggably received in a receptacle cage of a receptacle assembly to interconnect the plug module with another component, such as a circuit board through a receptacle module mounted to the circuit board. Due to the high speed of data transmission and the length of the traces on the circuit board between the receptacle module and other components mounted to the circuit board, some known communication systems bypass data transmission on the circuit board using a cable receptacle connector. The communication system includes an electronic package on the circuit board electrically connected to the receptacle assembly. Due to the high heat generated by the electronic package, the communication system typically includes a heat sink coupled to the electronic package. The height allowed for the heat sink within the communication system is typically constrained, leading to the heat sink having a larger footprint to achieve the necessary heat transfer capacity, which increases the overall size of the system and/or reduces the number of other electrical components that may be utilized in the communication system.

A need remains for a communication system having a reduced footprint for mating plug modules.

BRIEF DESCRIPTION OF THE INVENTION

In one embodiment, a receptacle connector assembly is provided including a receptacle cage having cage walls defining a first module channel, a second module channel stacked above the first module channel, and a third module channel stacked above the second module channel. The receptacle cage extends between a front end and a rear end. The cage walls include a top wall, a first side wall, a second side wall, a first separator panel, and a second separator panel. The first side wall extends along the first, second and third module channels. The second side wall extends along the first, second and third module channels. The first separator panel is located between the first and second module channels. The second separator panel is located between the second and third module channels. The receptacle connector assembly includes a first receptacle module in the first module channel for mating with a first plug module, a second receptacle module in the second module channel for mating with a second plug module, and a third receptacle module in the third module channel for mating with a third plug module.

In another embodiment, a receptacle connector assembly is provided including a receptacle cage configured to be mounted to a circuit board. The receptacle cage has cage walls defining a first module channel, a second module channel stacked above the first module channel, a third module channel stacked above the second module channel, and a fourth module channel stacked above the third module channel. The receptacle cage extends between a front end and a rear end. The cage walls include a top wall, a first side wall, and a second side wall. The first side wall extending along the first, second, third, and fourth module channels. The second side wall extending along the first, second, third, and fourth module channels. The receptacle connector assembly includes a first receptacle module in the first module channel for mating with a first plug module being a board module mounted directly to the circuit board. The receptacle connector assembly includes a second receptacle module in the second module channel for mating with a second plug module. The receptacle connector assembly includes a third receptacle module in the third module channel for mating with a third plug module being a cable module having cables extending from the third receptacle module remote from the receptacle cage. The receptacle connector assembly includes a fourth receptacle module in the fourth module channel for mating with a fourth plug module being a cable module having cables extending from the fourth receptacle module remote from the receptacle cage.

In another embodiment, a communication system is provided including a circuit board having an upper surface and a lower surface and including a cage mounting area and a package mounting area remote from the cage mounting area. An electronic package is mounted to the circuit board at the package mounting area. A receptacle cage is mounted to the circuit board at the cage mounting area. The receptacle cage includes cage walls defining a first module channel, a second module channel stacked above the first module channel, and a third module channel stacked above the second module channel. The receptacle cage extends between a front end and a rear end. The cage walls include a top wall, a first side wall, a second side wall, a first separator panel, and a second separator panel. The first side wall extends along the first, second and third module channels. The second side wall extends along the first, second and third module channels. The first separator panel is located between the first and second module channels. The second separator panel is located between the second and third module channels. The communication system includes a first receptacle module in the first module channel for mating with a first plug module being electrically connected to the circuit board and being mounted to the circuit board within the cage mounting area. The communication system includes a second receptacle module in the second module channel for mating with a second plug module being electrically connected to the circuit board. The communication system includes a third receptacle module in the third module channel for mating with a third plug module being electrically connected to the circuit board at a connection area remote from the cage mounting area by one or more cables.

DETAILED DESCRIPTION OF THE INVENTION

Figure 1:
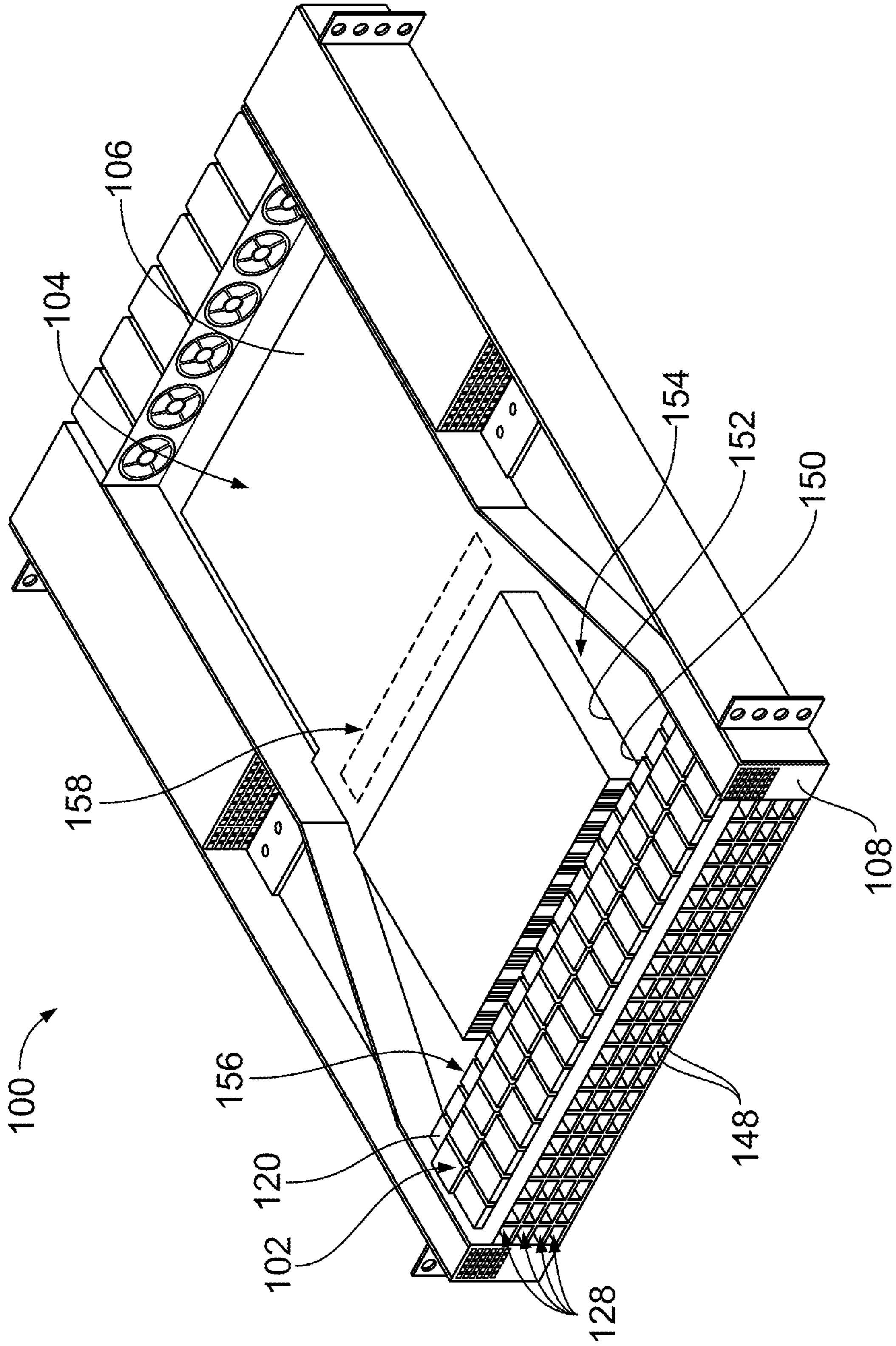
FIG. 1 is a front perspective view of a communication system formed in accordance with an exemplary embodiment.
Figure 2:
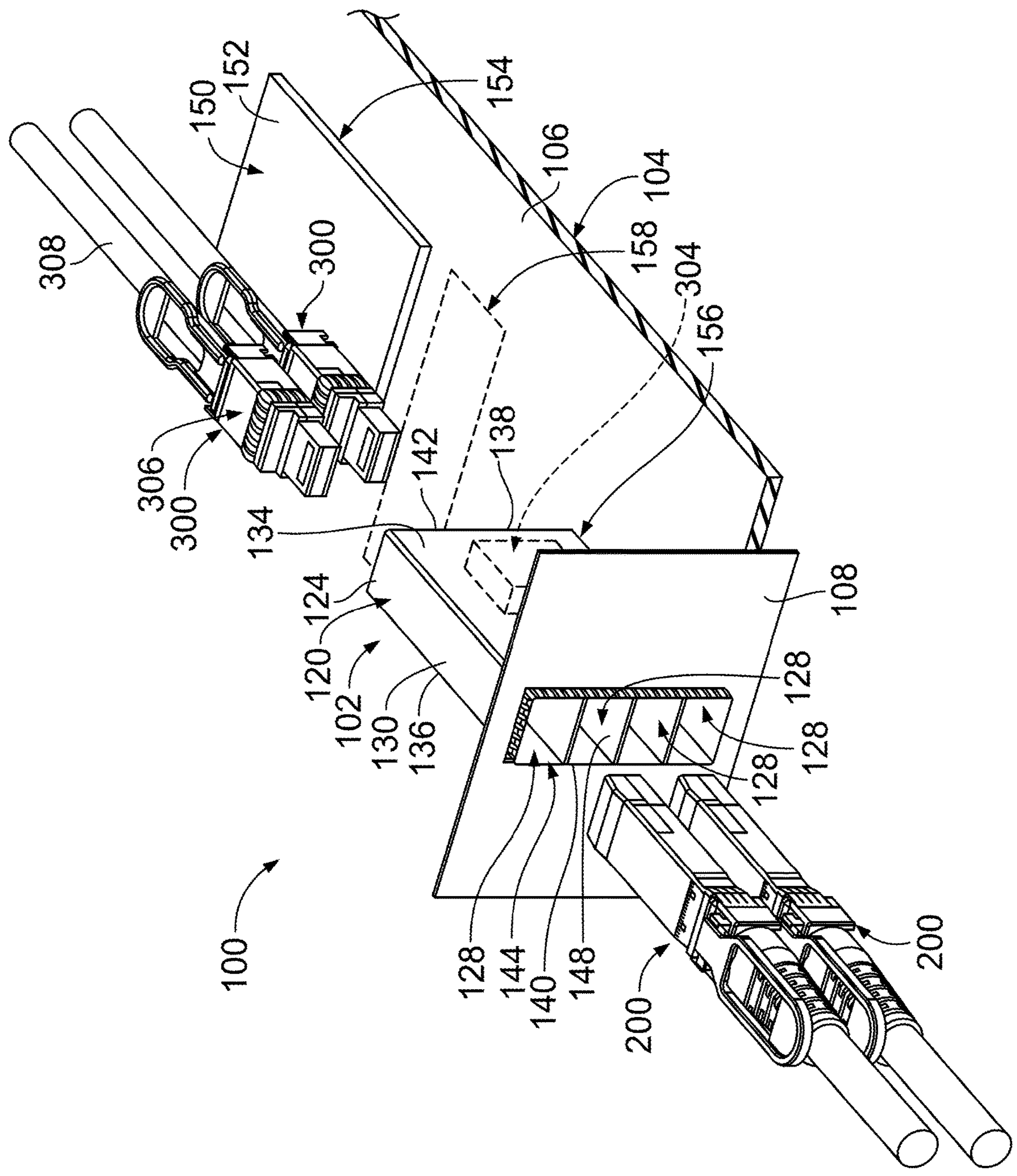
FIG. 2 is a front perspective view of a portion of the communication system 100 in accordance with an exemplary embodiment.
Figure 3:
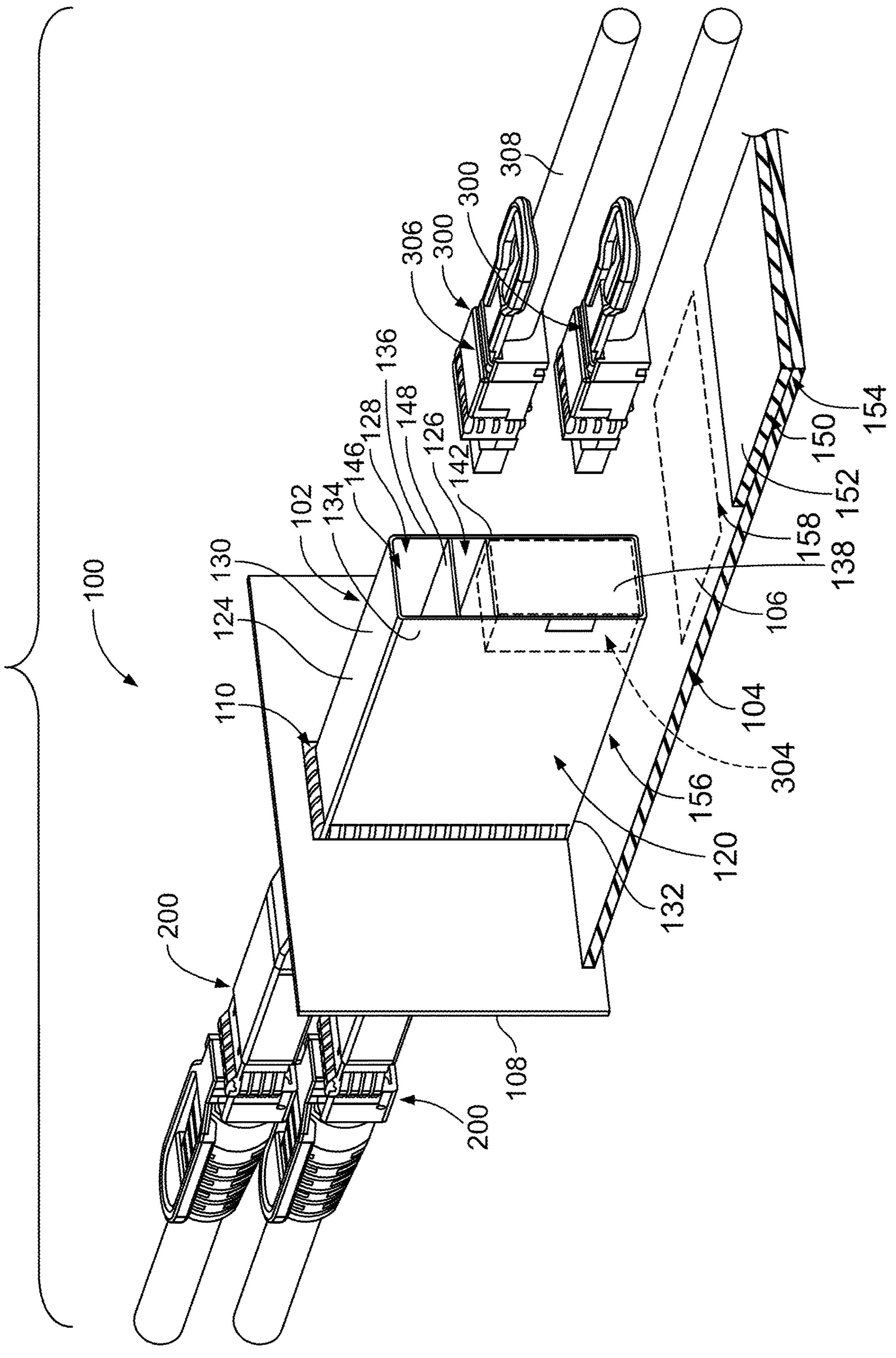
FIG. 3 is a rear perspective view of a portion of the communication system in accordance with an exemplary embodiment.

FIG. 1 is a front perspective view of a communication system 100 formed in accordance with an exemplary embodiment. FIG. 2 is a front perspective view of a portion of the communication system 100 in accordance with an exemplary embodiment. FIG. 3 is a rear perspective view of a portion of the communication system 100 in accordance with an exemplary embodiment.

The communication system 100 includes a receptacle connector assembly 102 and one or more plug modules 200 (two plug modules 200 shown in FIGS. 2 and 3) configured to be electrically connected to the receptacle connector assembly 102. The receptacle connector assembly 102 includes a plurality of receptacle modules 300 (two cable-mounted modules and one board-mounted module are shown in FIGS. 2 and 3) configured to be electrically connected to corresponding plug modules 200. The plug module 200 is pluggably coupled to the corresponding receptacle module 300 at a separable mating interface.

In an exemplary embodiment, the receptacle connector assembly 102 is mounted to a support structure 104. For example, in the illustrated embodiment, the support structure 104 may include a circuit board 106. The receptacle connector assembly 102 is mounted to the circuit board 106. The circuit board 106 may provide a ground reference for the receptacle connector assembly 102. The receptacle modules 300 are electrically connected to the circuit board 106 to electrically connect the plug modules 200 to the circuit board 106 through the receptacle modules 300. In an exemplary embodiment, one or more of the receptacle modules 300 are board modules 304 configured to be board mounted to the circuit board 106. The board modules 304 are directly mounted to the circuit board 106, such as within the footprint of the receptacle connector assembly 102. In an exemplary embodiment, one or more of the receptacle modules 300 are cable modules 306 configured to be provided at ends of cables 308. The cable modules 306 are not connected to the circuit board 106 within the footprint of the receptacle connector assembly 102, but rather may be electrically connected to the circuit board 106 (either direct attach or through a connector) remote from the footprint of the receptacle connector assembly 102. One or more of the receptacle modules 300 may be electrically connected to other electrical components via the cables 308 rather than connecting to the circuit board 106.

In an exemplary embodiment, the support structure 104 may additionally, or alternatively, include a panel 108. The panel 108 may be a rack panel in a server in various embodiments. The plug modules 200 may be plugged into the receptacle connector assembly 102 through an opening(s) in the panel 108. In various embodiments, the panel 108 may have greater than a 1U height, such as a 2U height. In other various embodiments, the panel 108 may include a cabinet or chassis of an electrical device, such as a computer. The panel 108 may be another type of support structure in alternative embodiments. The panel 108 may be a metal plate or sheet in various embodiments.

In an exemplary embodiment, the receptacle connector assembly 102 includes a receptacle cage 120. The receptacle modules 300 are positioned in a rear of the receptacle cage 120. The plug modules 200 are configured to be loaded into a front of the receptacle cage 120 to mate with the receptacle modules 300 inside the receptacle cage 120. In various embodiments, the receptacle cage 120 is enclosed and provides electrical shielding for the receptacle modules 300 and the plug modules 200.

The receptacle cage 120 includes a plurality of cage walls 124 that define a cavity 126. The cage walls 124 may be walls defined by solid sheets, perforated walls to allow airflow therethrough, or walls with cutouts, such as for a heat transfer device such as a heatsink, heat spreader, cold plate, and the like to pass therethrough. In the illustrated embodiment, the cage walls 124 are stamped and formed walls defining shielding walls. The cavity 126 may be subdivided by corresponding cage walls 124 to form a plurality of module channels 128 that are stacked (for example, stacked vertically) for receipt of corresponding plug modules 200 and receptacle modules 300. The cage walls 124 form rectangular shaped module channels 128 in an exemplary embodiment extending along a longitudinal axis between the front and the rear. In an exemplary embodiment, the cavity 126 is divided into greater than two stacked module channels 128 to house greater than two receptacle modules 300 and receive greater than two plug modules 200. For example, the receptacle cage 120 may include three stacked module channels 128, four stacked module channels 128, or more. In various embodiments, the cavity 126 may include additional module channels 128 side-by-side or ganged to further increase the amount of receptacle modules 300 held within the receptacle cage 120 (for example, 3H×2 W, 3H×3 W, 4H×2 W, 4H×4 W, and the like). FIG. 1 illustrates the receptacle cage 120 with multiple stacked module channels 128 (for example, sixteen stacks or 4H×16 W), while FIGS. 2 and 3 illustrate the receptacle cage 120 with a single stack of module channels 128.

In an exemplary embodiment, the cage walls 124 of the receptacle cage 120 include a top wall 130, a bottom wall 132, a first side wall 134, and a second side wall 136 for each module channel 128. The walls 130, 132, 134, 136 are the outer or exterior walls. The bottom wall 132 may rest on the circuit board 106 when the circuit board 106 is provided. In various embodiments, the cage walls 124 may include a rear wall 138 extending along at least a portion of the rear o the receptacle cage 120. In an exemplary embodiment, the cage walls 124 include cage mounting tabs for mounting the receptacle cage 120 to the circuit board 106. For example, the cage mounting tabs may be press-fit pins configured to be press-fit into vias in the circuit board 106. Other types of cage mounting tabs may be used in alternative embodiments.

The receptacle cage 120 extends between a front end 140 and a rear end 142. Front ports 144 are provided at the front end 140 providing access to the corresponding module channels 128 for the plug modules 200. Rear ports 146 may be provided at the rear end 142 providing access to the corresponding module channels 128 for the receptacle modules 300. The rear ports 146 may pass through the rear wall 138. Alternatively, the rear ports 146 may be defined between the side walls 134, 136 rearward of the module channels 128 that do not include the rear wall 138. For example, the rear wall 138 may be located behind the lower module channel(s) 128 but not behind the upper module channel(s) 128.

Some of the cage walls 124 may be interior cage walls that separate or divide the cavity 126 into the various module channels 128. For example, the cage walls 124 may include a divider 148 separating the module channels 128 (for example, a horizontal divider or a vertical divider). The divider 148 may define the top wall, the bottom wall, the first side wall, or the second side wall of one or more of the module channels 128, but not an exterior wall. The divider 148 may be a single wall or a double wall with a gap between the walls forming a space for a heat sink, airflow, or light pipes.

In an exemplary embodiment, the receptacle cage 120 includes one or more EMI gaskets providing EMI shielding at the front end 140 and/or the rear end 142. The EMI gasket provides EMI shielding between the cage walls 124 and the plug modules 200. The EMI gaskets prevent EMI leakage along the cage walls 124 or along the modules 200, 300.

In an exemplary embodiment, the communication system 100 includes an electronic package 150 coupled to the circuit board 106. The electronic package 150 may be a chip, an integrated circuit, a processor, a memory module, or another electronic component. In various embodiments, the electronic package 150 is an ASIC. The electronic package 150 is coupled to an upper surface 152 of the circuit board 106 at a package mounting area 154. The package mounting area 154 is remote from a cage mounting area 156, which is the area that the receptacle cage 120 is mounted. The cage mounting area 156 may be located proximate to an edge (for example, front edge) of the circuit board 106, whereas the package mounting area 154 may be located in a center of the circuit board 106 or at another edge (for example, rear edge) of the circuit board 106. Optionally, the package mounting area 154 may be spaced apart from the cage mounting area 156 by a distance greater than a length of the package mounting area 154 and/or greater than a length of the cage mounting area 156. Other electrical components may be mounted in the space between the package mounting area 154 and the cage mounting area 156.

In an exemplary embodiment, the circuit board 106 includes a connection area 158 remote from the cage mounting area 156. The connection area 158 may be located between the package mounting area 154 and the cage mounting area 156, such as proximate to the package mounting area 154. The connection area 158 may be located closer to the package mounting area 154 in various embodiments. The receptacle modules 300 are configured to be connected to the circuit board 106 at the connection area 158. For example, the cables from the receptacle modules 300 may be terminated directly to the circuit board 106 at the connection area 158 (for example, soldered). In other embodiments, a connector may be provided at the end of the cables, which is coupled to the circuit board 106 or to a connector mounted to the circuit board 106.

Figure 4:
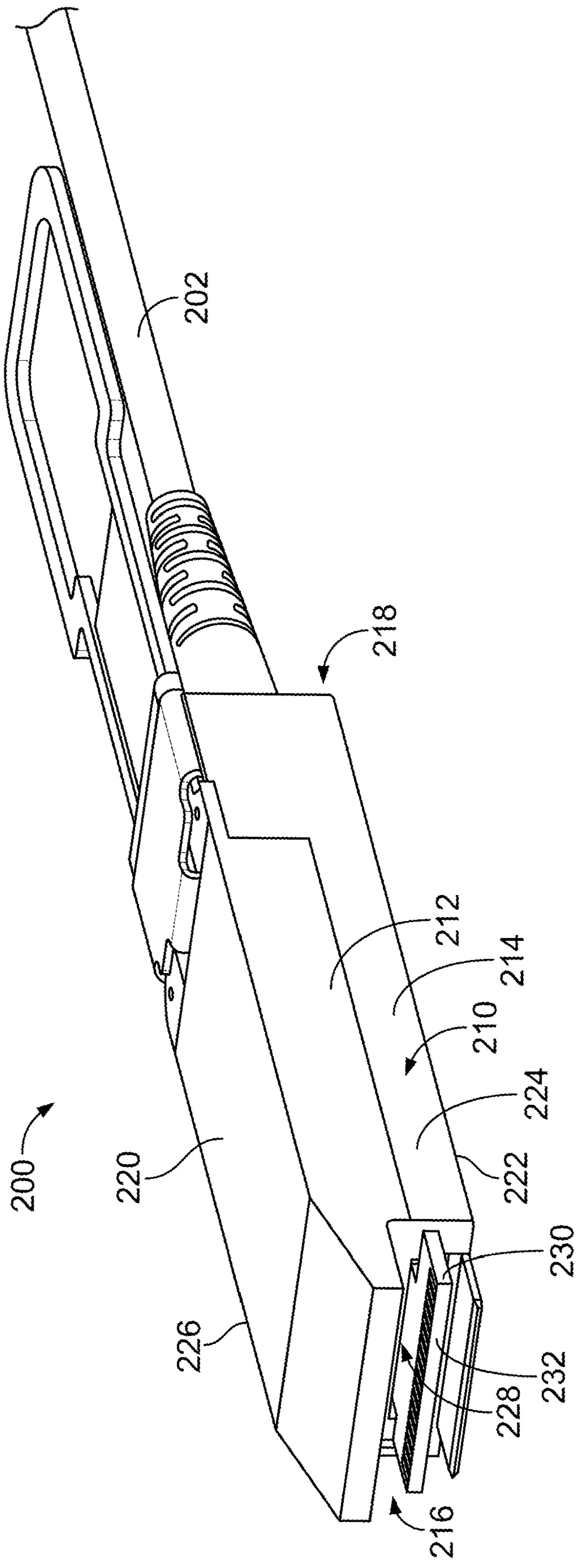
FIG. 4 is a perspective view of a plug module of the communication system in accordance with an exemplary embodiment.

FIG. 4 is a perspective view of the plug module 200 in accordance with an exemplary embodiment. The plug module 200 includes a plug housing 210 defined by one or more shells, such as an upper shell 212 and a lower shell 214. In an exemplary embodiment, the plug housing 210 is manufactured from a conductive material, such as a metal material. The plug housing 210 provides electrical shielding for the plug module 200. The plug housing 210 may be thermally conductive. The plug housing 210 includes a mating end 216 and an opposite cable end 218. One or more cables 202 extend from the cable end 218. The mating end 216 is configured to be inserted into the corresponding module channel 128 (shown in FIG. 2). The cable end 218 is configured to extend from the front end 140 of the receptacle cage 120 (shown in FIG. 3) when the plug module 200 is plugged into the receptacle cage 120.

The plug housing 210 includes a top wall 220, a bottom wall 222, a first side wall 224 extending between the top wall 220 and the bottom wall 222, and a second side wall 226 extending between the top wall 220 and the bottom wall 222. The plug housing 210 surrounds a plug module cavity 228. The plug module cavity 228 houses electrical components of the plug module 200. The cables 202 may extend into the plug module cavity 228 for termination to the electrical components.

In an exemplary embodiment, the plug module 200 includes a plug module circuit board 230 in the plug module cavity 228. The plug module circuit board 230 may be accessible at the mating end 216. The plug module circuit board 230 is configured to be communicatively coupled to the receptacle module 300 (shown in FIG. 4). For example, a mating edge 232 of the plug module circuit board 230 may be plugged into the receptacle module 300, such as in a card slot of the receptacle module 300. The plug module circuit board 230 includes electrical components used for operating and/or using the plug module 200. For example, the plug module circuit board 230 may have conductors, traces, pads, electronics, sensors, controllers, switches, inputs, outputs, and the like to form various circuits.

Figure 5:
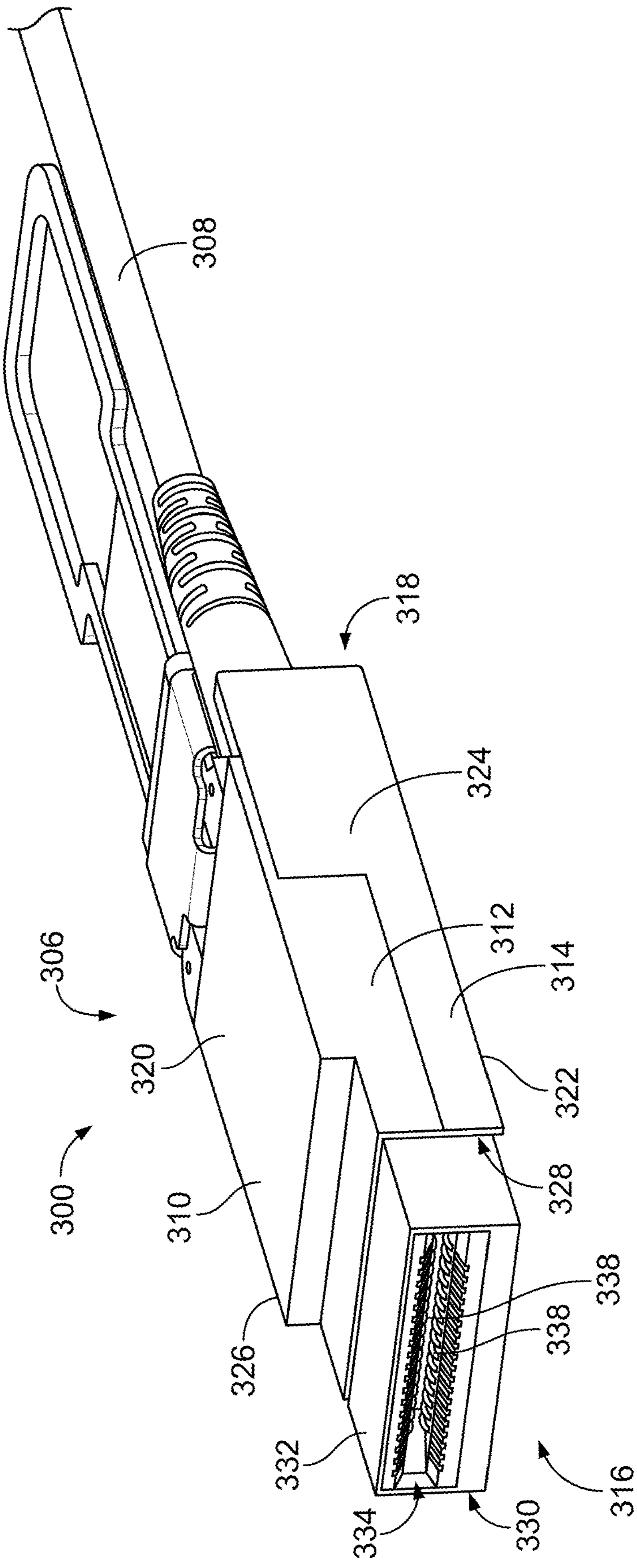
FIG. 5 is a perspective view of a receptacle module of the communication system in accordance with an exemplary embodiment.
Figure 6:
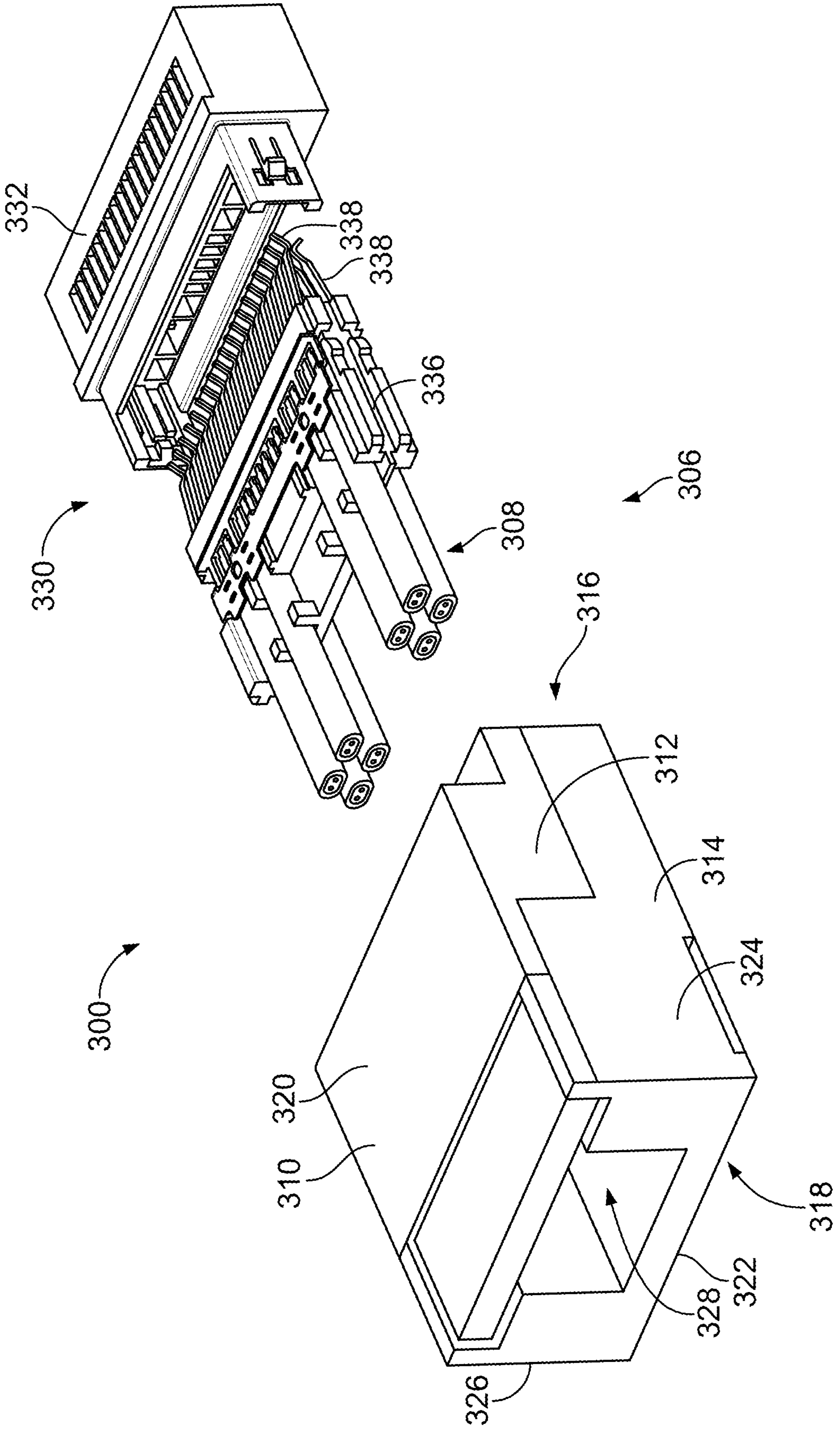
FIG. 6 is a rear, exploded view of the receptacle module shown in FIG. 5.

FIG. 5 is a perspective view of the receptacle module 300 in accordance with an exemplary embodiment, showing the receptacle module 300 as a cable module 306. FIG. 6 is a rear, exploded view of the receptacle module 300 in accordance with an exemplary embodiment. The cable module 306 includes a receptacle housing 310 defined by one or more shells, such as an upper shell 312 and a lower shell 314. In an exemplary embodiment, the receptacle housing 310 is manufactured from a conductive material, such as a metal material. The receptacle housing 310 provides electrical shielding for the cable module 306. The receptacle housing 310 may be thermally conductive. The receptacle housing 310 includes a mating end 316 and an opposite cable end 318. The cable 308 extends from the cable end 318. The mating end 316 is configured to be inserted into the corresponding module channel 128 (shown in FIG. 3). The cable end 318 is configured to extend from the rear end 142 of the receptacle cage 120 (shown in FIG. 3) when the cable module 306 is plugged into the receptacle cage 120. The receptacle housing 310 may have an outer periphery sized and shaped similar to the plug module 200 (shown in FIG. 4) to fit into the module channel 128.

The receptacle housing 310 includes a top wall 320, a bottom wall 322, a first side wall 324 extending between the top wall 320 and the bottom wall 322, and a second side wall 326 extending between the top wall 320 and the bottom wall 322. The receptacle housing 310 surrounds a receptacle module cavity 328. The receptacle module cavity 328 houses electrical components of the cable module 306. The cables 308 may extend into the receptacle module cavity 328 for termination to the electrical components.

In an exemplary embodiment, the cable module 306 includes a receptacle connector 330 coupled to the mating end 316 of the receptacle housing 310. The receptacle connector 330 may be at the end of the receptacle housing 310. In other embodiments, the receptacle connector 330 may be housed in the receptacle housing 310.

The receptacle connector 330 includes a receptacle connector housing 332 having a card slot 334 (FIG. 5) configured to receive the plug module circuit board 230 (shown in FIG. 4). The receptacle connector 330 includes a contact holder 336 (FIG. 6) and contacts 338 held by the contact holder 336. The contact holder 336 is manufactured from a dielectric material, such as plastic material. The contacts 338 may be coupled to an upper surface and a lower surface of the contact holder 336 to define an upper contact array for mating with the upper surface of the plug module circuit board 230 and a lower contact array for mating with a lower surface of the plug module circuit board 230. Conductors of the cables 308 may be terminated to the contacts 338, such as being soldered to the contacts 338. A ground shield may be electrically connected to cable shields of the cables 308 and ground contacts of the contacts 338. Mating ends of the contacts 338 are configured to be loaded into the receptacle connector housing 332 for mating with contact pads at the edge of the plug module circuit board 230 loaded into the card slot 334.

Figure 7:
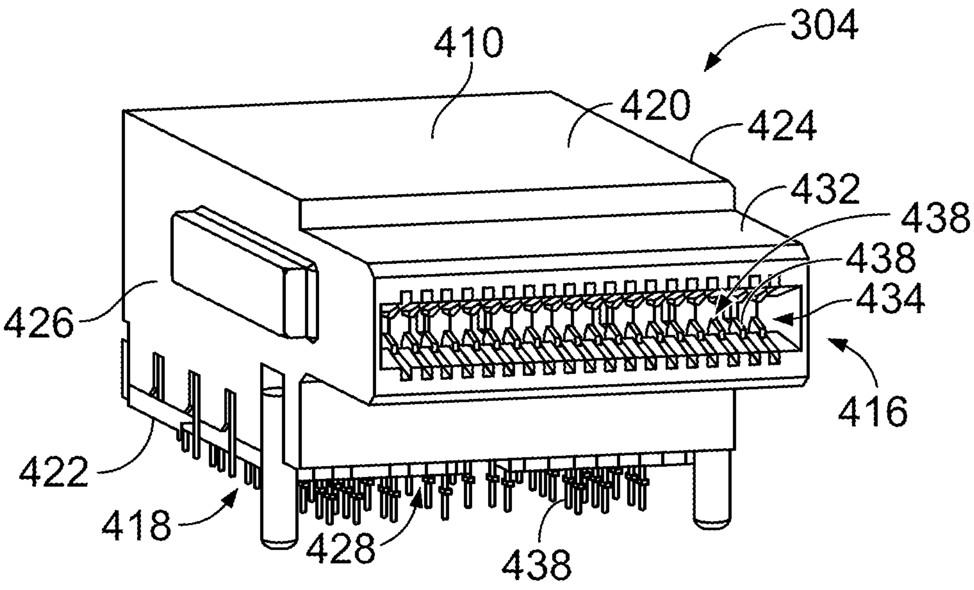
FIG. 7 is a perspective view of the receptacle module of the communication system in accordance with an exemplary embodiment.

FIG. 7 is a perspective view of the receptacle module 300 in accordance with an exemplary embodiment, showing the receptacle module 300 as a board module 304. The board module 304 includes a receptacle housing 410. In an exemplary embodiment, the receptacle housing 410 is manufactured from a dielectric material, such as a plastic material. The receptacle housing 410 includes a mating end 416 and a mounting end 418. In the illustrated embodiment, the receptacle housing 410 is a right-angle housing having the mating end 416 perpendicular to the mounting end 418. The mounting end 418 is configured to be mounted to the circuit board 106 (shown in FIG. 2). The mating end 416 is configured to be positioned in the corresponding module channel(s) 128 (shown in FIG. 2) for mating with the plug module 200.

The receptacle housing 410 includes a top wall 420, a bottom wall 422, a first side wall 424 extending between the top wall 420 and the bottom wall 422, and a second side wall 426 extending between the top wall 420 and the bottom wall 422. The receptacle housing 410 surrounds a contact cavity 428. The contact cavity 428 houses electrical components of the board module 304, such as contact modules or individual contacts.

In an exemplary embodiment, the receptacle housing 410 includes a mating shroud 432 having a card slot 434 configured to receive the plug module circuit board 230 (shown in FIG. 4). The receptacle housing 410 holds a plurality of contacts 438. The contacts 438 may be coupled to an upper surface and a lower surface of the mating shroud 432 to define an upper contact array for mating with the upper surface of the plug module circuit board 230 and a lower contact array for mating with a lower surface of the plug module circuit board 230. The contacts 438 have mating ends extending into the card slot 434 for interfacing with the plug module circuit board 230. For example, the mating ends of the contacts 438 are configured to be loaded into the receptacle connector housing 432 for mating with contact pads at the edge of the plug module circuit board 230 loaded into the card slot 434. The contacts 438 have terminating ends extending from the mounting end 418 for termination to the circuit board 106. For example, the terminating ends may include compliant pins configured to be press fit into plated vias of the circuit board 106. In an exemplary embodiment, the contacts 438 are right angle contacts having the mating ends perpendicular to the terminating ends. FIG. 7 illustrates the receptacle housing 410 having a single card slot 434; however, the receptacle housing 410 may include additional card slots in alternative embodiments.

Figure 8:
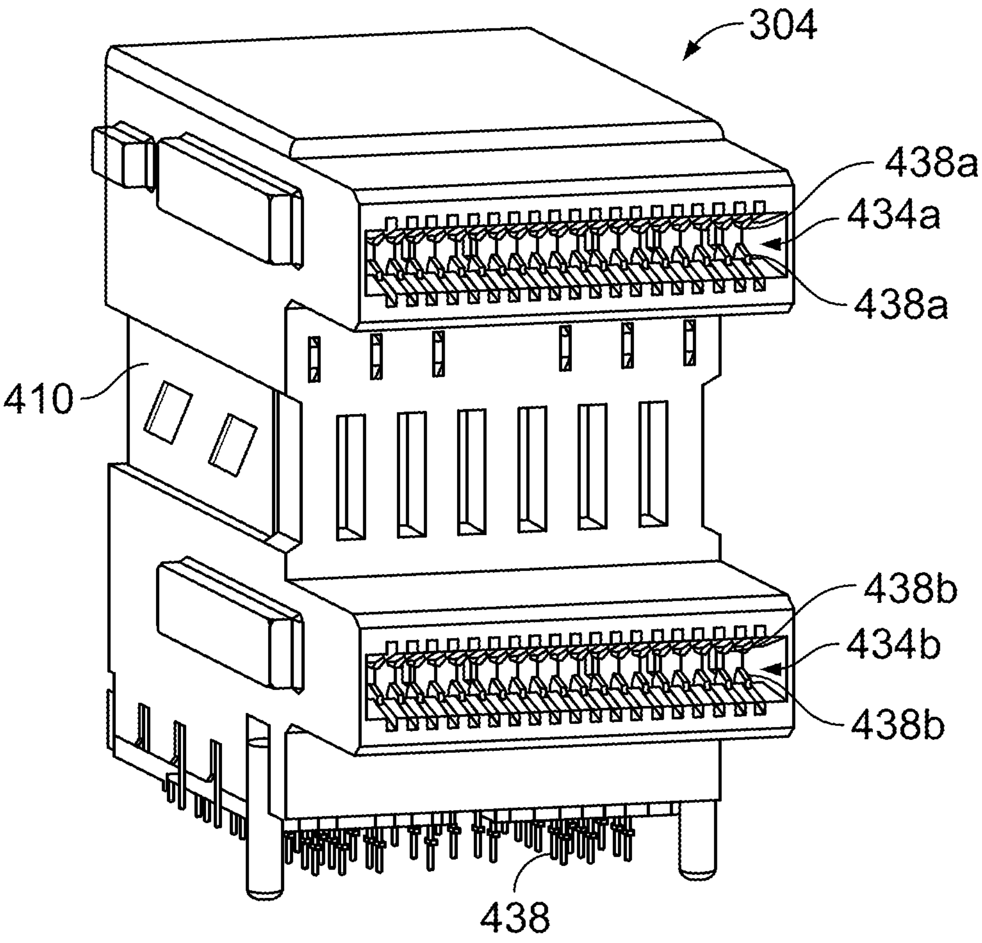
FIG. 8 is a perspective view of the receptacle module in accordance with an exemplary embodiment.

FIG. 8 is a perspective view of the receptacle module 300 in accordance with an exemplary embodiment, showing the receptacle module 300 as a board module 304. FIG. 8 illustrates the board module 304 as a stacked board module 304. The receptacle housing 410 of the stacked board module 304 includes a lower card slot **434*a* and an upper card slot 434*b*. The lower card slot 434*a* is configured to be located in the module channel 128 (shown in FIG. 3) closest to the circuit board 106 and the upper card slot 434*b* is configured to be located in the contact 128 above the lowest card slot 434. The contacts 438 include lower contacts 438*a* in the lower card slot 434*a* and upper contacts 438*b* in the upper card slot 434*b*. In an exemplary embodiment, the receptacle housing 410 is a single, unitary housing such that both the lower and upper contacts 438*a*, 438*b* are received in the same housing. Alternatively, the receptacle housing 410 may be a multi-piece housing, one having the lower card slot 434*a* and one having the upper card slot 434*b*. The housing pieces may be coupled together to form the receptacle housing 410**.

Figure 9:
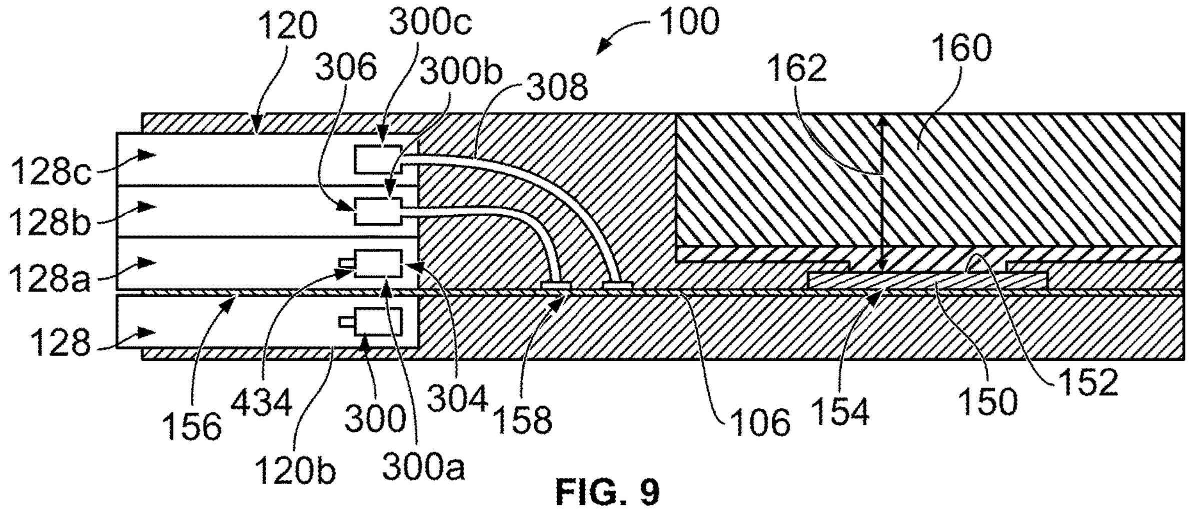
FIG. 9 is a side view of the communication system in accordance with an exemplary embodiment.

FIG. 9 is a side view of the communication system 100 in accordance with an exemplary embodiment. In the illustrated embodiment, the receptacle cage 120 includes three module channels 128, such as a first module channel **128*a*, a second module channel 128*b*, and a third module channel 128*c*. The second module channel 128*b* is stacked above the first module channel 128*a*. The third module channel 128*c* is stacked above the second module channel 128*b***.

In the illustrated embodiment, the communication system 100 includes three of the receptacle modules 300, including a first receptacle module **300*a* in the first module channel 128*a* for mating with a first plug module; a second receptacle module 300*b* in the second module channel 128*b* for mating with a second plug module; and a third receptacle module 300*c* in the third module channel 128*c* for mating with a third plug module. The first receptacle module 300*a* is considered an "inner" receptacle module because the first receptacle module 300*a* is closest to the circuit board 106, the third receptacle module 300*c* is considered an "outer" receptacle module because the third receptacle module 300*c* is furthest from the circuit board 106, and the second receptacle module 300*b* is considered a "central" receptacle module because the second receptacle module 300*b* is located between the inner and outer receptacle modules. In the illustrated embodiment, the first receptacle module 300*a* is a board module 304, the second receptacle module 300*b* is a cable module 306, and the third receptacle module 300*c* is a cable module 306**.

The board module 304 is coupled to the upper surface 152 of the circuit board 106. In the illustrated embodiment, the board module 304 is a single-height board module 304 (for example, shown in FIG. 7) having a single card slot 434. The board module 304 is directly coupled to the circuit board 106 within the cage mounting area 156. For example, the board module 304 is contained within the footprint of the receptacle cage 120. The board module 304 is electrically connected to the electronic package 150 through traces of the circuit board 106.

The cable modules 306 are received in the module channels **128*b*, 128*c*. The cables 308 extend from the cable modules 306 and extend exterior of the receptacle cage 120. The cables 308 are connected to the circuit board 106 at the connection areas 158. The cables 308 provide signal paths from the cable modules 306 to locations near the electronic package 150. The signal paths may be shielded along the lengths of the cables 308 to improve signal integrity. The cables 308 eliminate trace routing through portions of the circuit board 106, making trace routing from the receptacle mounting area 154** easier.

In the illustrated embodiment, the communication system 100 includes a lower receptacle cage 120*b* mounted to the lower surface of the circuit board 106. The lower receptacle cage 120*b* includes a single module channel in the illustrated embodiment. However, the lower receptacle cage 120*b* may include multiple module channels, such as two module channels, three module channels, four module channels, and the like.

In an exemplary embodiment, the communication system 100 has a high density for connection with the plug modules 200. For example, four plug modules 200 may be coupled to the receptacle modules 300 to electrically connect with the electronic package 150 (three above the circuit board 106 and one below the circuit board 106). By providing the tall receptacle cage 120, having more than two module channels 128, above the circuit board 106 provides a tall space above the electronic package 150 for a heat transfer device 160. For example, the circuit board 106 may be off-centered, such as closer to the bottom. The heat transfer device 160 may be a heat sink or cold plate in various embodiments. The triple high receptacle cage allows for a taller heat sink as compared to a communication system having a double height receptacle cage. For example, the heat transfer fins of the heat sink may be taller allowing for greater heat dissipation from the heat sink. As such, the heat transfer device 160 may have greater heat dissipation capacity for cooling the electronic package 150 or the heat transfer device may have a smaller footprint allowing for a greater number of electronic components or a smaller overall circuit board 106 to be used. In an exemplary embodiment, the heat transfer device 160 has a height 162 greater than a height of two module channels 128. For example, the bottom of the heat transfer device 160 may be located below a top of the first module channel 128*a* and the top of the heat transfer device 160 may be located above a top of the third module channel 128*c*.

Figure 10:
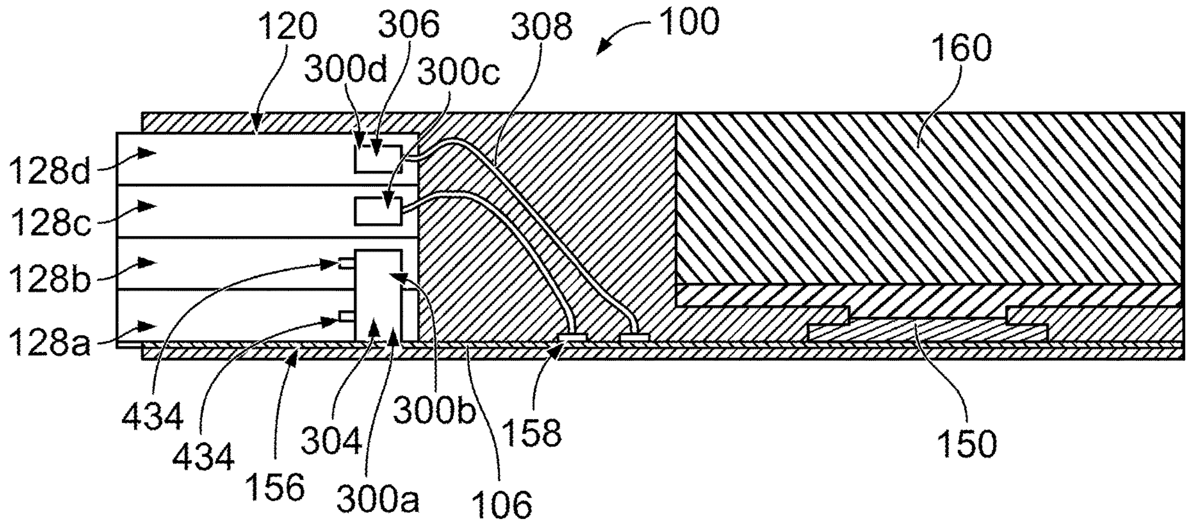
FIG. 10 is a side view of the communication system in accordance with an exemplary embodiment.

FIG. 10 is a side view of the communication system 100 in accordance with an exemplary embodiment. In the illustrated embodiment, the receptacle cage 120 includes four module channels 128, such as the first, second, and third module channels 128*a*, 128*b*, 128*c* as well as a fourth module channel 128*d*. The communication system 100 includes four of the receptacle modules 300, including a first receptacle module 300*a* in the first module channel 128*a* for mating with a first plug module; a second receptacle module 300*b* in the second module channel 128*b* for mating with a second plug module; a third receptacle module 300*c* in the third module channel 128*c* for mating with a third plug module; and a fourth receptacle module 300*d* in the fourth module channel 128*d* for mating with a fourth plug module. The fourth receptacle module 300*d* is considered the "outer" receptacle module because the fourth receptacle module 300*d* is furthest from the circuit board 106. In the illustrated embodiment, the first receptacle module 300*a* is a board module 304, the second receptacle module 300*b* is a board module 304, the third receptacle module 300*c* is a cable module 306, and the fourth receptacle module 300*d* is a cable module 306.

In the illustrated embodiment, the board module 304 is a double-height board module 304 (for example, shown in FIG. 8) having upper and lower card slots 434. The board modules 304 are received in the module channels 128*a*, 128*b*. The board module 304 is directly coupled to the circuit board 106 within the cage mounting area 156. For example, the board module 304 is contained within the footprint of the receptacle cage 120.

The cable modules 306 are received in the module channels 128*c*, 128*d*. The cables 308 extend from the cable modules 306 and extend exterior of the receptacle cage 120. The cables 308 are connected to the circuit board 106 at the connection areas 158.

In an exemplary embodiment, the communication system 100 has a high density for connection with the plug modules 200. For example, four plug modules 200 may be coupled to the receptacle modules 300 above the circuit board 106 to electrically connect with the electronic package 150. However, additional modules may be below the circuit board 106 in alternative embodiments). By providing the tall receptacle cage 120, having more than two module channels 128, above the circuit board 106 provides a tall space above the electronic package 150 for the heat transfer device 160. The quad-high receptacle cage allows for a taller heat sink as compared to a communication system having a double height receptacle cage or a triple height receptacle cage. The heat transfer fins of the heat sink may be taller allowing for greater heat dissipation from the heat sink. As such, the heat transfer device 160 may have greater heat dissipation capacity for cooling the electronic package 150 or the heat transfer device may have a smaller footprint allowing for a greater number of electronic components or a smaller overall circuit board 106 to be used.

Figure 11:
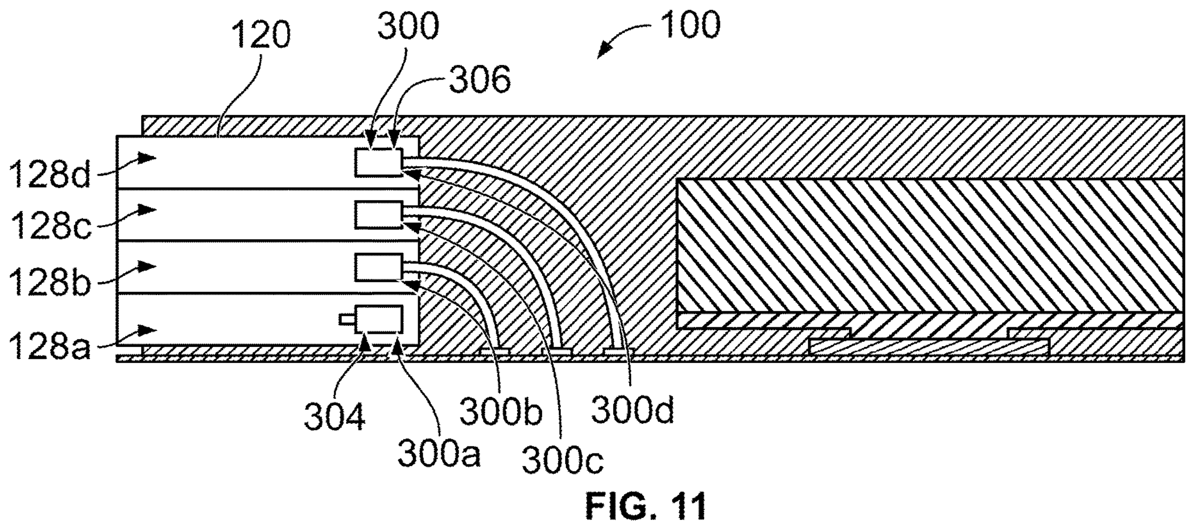
FIG. 11 is a side view of the communication system in accordance with an exemplary embodiment.

FIG. 11 is a side view of the communication system 100 in accordance with an exemplary embodiment. In the illustrated embodiment, the receptacle cage 120 includes the first, second, third, and fourth module channels 128*a*, 128*b*, 128*c*, 128*d*. The communication system 100 includes four of the receptacle modules 300. In the illustrated embodiment, the first receptacle module 300*a* is a board module 304 and the second, third, and fourth receptacle modules 300*b*, 300*c*, 300*d* are cable modules 306.

Figure 12:
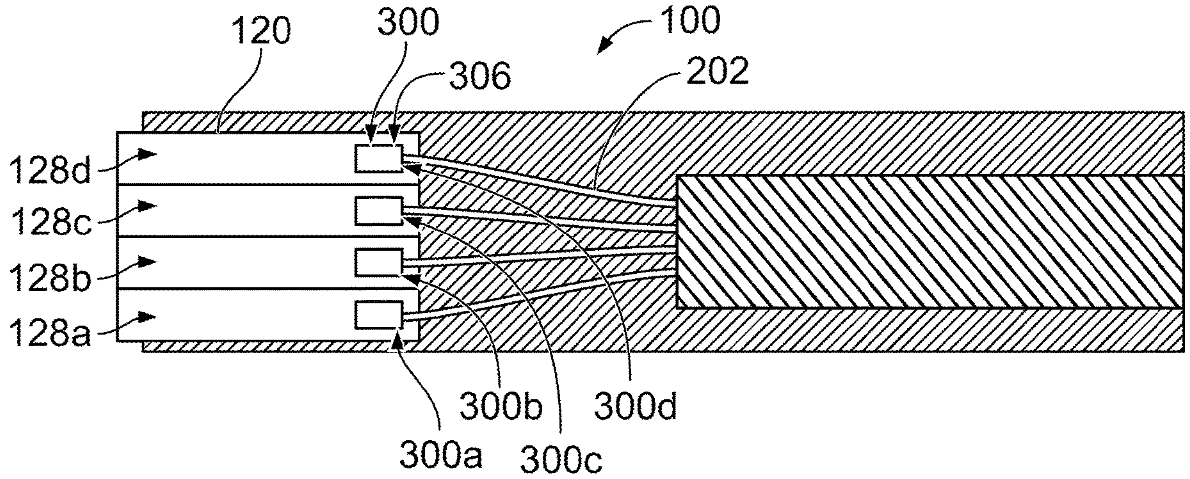
FIG. 12 is a side view of the communication system in accordance with an exemplary embodiment.

FIG. 12 is a side view of the communication system 100 in accordance with an exemplary embodiment. In the illustrated embodiment, the receptacle cage 120 is not mounted to a circuit board, but rather may be free-standing or may be mounted to another component, such as a chassis, a rack, and the like. The receptacle cage includes the first, second, third, and fourth module channels 128*a*, 128*b*, 128*c*, 128*d*. The communication system 100 includes four of the receptacle modules 300. In the illustrated embodiment, the first, second, third, and fourth receptacle modules 300*b*, 300*c*, 300*d* are cable modules 306. The cables 202 may be coupled to an electrical component 170 housed within the receptacle cage 120. Alternatively, the cables 202 may extend exterior of the receptacle cage 120 to an electrical component remote from the receptacle cage. Optionally, the cables 202 may extend into another receptacle cage for connection to a receptacle module in the other receptacle cage.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A receptacle connector assembly comprising:

a receptacle cage having cage walls defining a first module channel, a second module channel stacked above the first module channel, and a third module channel stacked above the second module channel, the receptacle cage extending between a front end and a rear end, the cage walls including a top wall, a first side wall, a second side wall, a first separator panel, and a second separator panel, the first side wall extending along the first, second and third module channels, the second side wall extending along the first, second and third module channels, the first separator panel located between the first and second module channels, the second separator panel located between the second and third module channels;

a first receptacle module in the first module channel for mating with a first plug module;

a second receptacle module in the second module channel for mating with a second plug module; and a third receptacle module in the third module channel for mating with a third plug module.

2. The receptacle connector assembly of claim 1, wherein at least one of the first and second receptacle modules is a board module and at least one of the second and third receptacle modules is a cable module.

3. The receptacle connector assembly of claim 1, wherein the first receptacle module is a first board module and the second receptacle module is a second board module stacked above the first board module, the first and second board modules having first and second contacts, respectively, configured to be terminated to a circuit board interior of a footprint of the receptacle cage, the third receptacle module being a cable module having third contacts terminated to an end of a cable, the cable extending from the cable module exterior of the receptacle cage.

4. The receptacle connector assembly of claim 1, wherein the first receptacle module and the second receptacle module are integrated with a common housing holding the first contacts of the first receptacle module and the second contacts of the second receptacle module.

5. The receptacle connector assembly of claim 1, wherein the receptacle cage and the first, second, and third receptacle modules are all configured to be stacked on a same side of a circuit board.

6. The receptacle connector assembly of claim 1, wherein the first module channel, the second module channel, and the third module channel are identical to interchangeably receive any of the first, second, or third plug modules.

7. The receptacle connector assembly of claim 1, wherein the top wall, the first side wall, and the second side wall are formed from a common metal panel.

8. The receptacle connector assembly of claim 1, wherein the receptacle cage includes a bottom configured to be mounted to a circuit board, the top wall being parallel to and spaced apart from the bottom with the first, second, and third module channels aligned in a stacked arrangement between the bottom and the top wall.

9. The receptacle connector assembly of claim 1, wherein the cage walls further define a fourth module channel stacked above the third module channel, the first and second side walls extending along the fourth module channel, the cage walls further including a third separator panel located between the third and fourth module channels.

10. The receptacle connector assembly of claim 1, wherein the receptacle cage incudes a bottom configured to be mounted to an upper surface of a circuit board, the receptacle connector assembly further comprising a lower receptacle cage having lower cage walls defining a fourth module channel, the lower receptacle cage configured to be mounted to a lower surface of the circuit board such that the fourth module channel is aligned in a stacked arrangement with the first, second, and third module channels with the circuit board between the fourth module channel and the first module channel, the receptacle connector assembly further comprising a fourth receptacle module in the fourth module channel for mating with a fourth plug module.

11. A receptacle connector assembly comprising:

a receptacle cage configured to be mounted to a circuit board, the receptacle cage having cage walls defining a first module channel, a second module channel stacked above the first module channel, a third module channel stacked above the second module channel, and a fourth module channel stacked above the third module channel, the receptacle cage extending between a front end and a rear end, the cage walls including a top wall, a first side wall, and a second side wall, the first side wall extending along the first, second, third, and fourth module channels, the second side wall extending along the first, second, third, and fourth module channels;

a first receptacle module in the first module channel for mating with a first plug module, the first receptacle module being a board module mounted directly to the circuit board;

a second receptacle module in the second module channel for mating with a second plug module;

a third receptacle module in the third module channel for mating with a third plug module, the third receptacle module being a cable module having cables extending from the third receptacle module remote from the receptacle cage; and a fourth receptacle module in the fourth module channel for mating with a fourth plug module, the fourth receptacle module being a cable module having cables extending from the fourth receptacle module remote from the receptacle cage.

12. The receptacle connector assembly of claim 11, wherein the second receptacle module is a board module mounted directly to the circuit board.

13. The receptacle connector assembly of claim 12, wherein the first receptacle module and the second receptacle module are integrated with a common housing holding first contacts of the first receptacle module and second contacts of the second receptacle module.

14. The receptacle connector assembly of claim 12, wherein the first and second receptacle modules have first and second contacts, respectively, configured to be terminated to the circuit board interior of a footprint of the receptacle cage.

15. The receptacle connector assembly of claim 11, wherein the receptacle cage and the first, second, third, and fourth receptacle modules are all configured to be stacked on a same side of the circuit board.

16. The receptacle connector assembly of claim 11, wherein the top wall, the first side wall, and the second side wall are formed from a common metal panel.

17. The receptacle connector assembly of claim 11, wherein the receptacle cage includes a bottom configured to be mounted to the circuit board, the top wall being parallel to and spaced apart from the bottom with the first, second, third, and fourth module channels aligned in a stacked arrangement between the bottom and the top wall.

18. A receptacle connector assembly comprising:

a receptacle cage having cage walls defining a first module channel, a second module channel stacked above the first module channel, and a third module channel stacked above the second module channel, the receptacle cage extending between a front end and a rear end, the cage walls including a top wall, a first side wall, a second side wall, a first separator panel, and a second separator panel, the first side wall extending along the first, second and third module channels, the second side wall extending along the first, second and third module channels, the first separator panel located between the first and second module channels, the second separator panel located between the second and third module channels;

a first receptacle module in the first module channel for mating with a first plug module, the first receptacle module being a cable module having first contacts terminated to an end of a first cable, the first cable extending from the cable module exterior of the receptacle cage;

a second receptacle module in the second module channel for mating with a second plug module, the second receptacle module being a cable module having second contacts terminated to an end of a second cable, the second cable extending from the cable module exterior of the receptacle cage; and a third receptacle module in the third module channel for mating with a third plug module, the third receptacle module being a cable module having third contacts terminated to an end of a third cable, the third cable extending from the cable module exterior of the receptacle cage.

19. The receptacle connector assembly of claim 18, wherein the receptacle cage is mounted to a circuit board.

20. The receptacle connector assembly of claim 19, wherein the receptacle cage includes a fourth module channel located below the first module channel adjacent the circuit board, a fourth receptacle module in the fourth module channel for mating with a fourth plug module, the fourth receptacle module being a board module having board contacts terminated to the circuit board interior of a footprint of the receptacle cage.

21. A communication system comprising:

a circuit board having an upper surface and a lower surface, the circuit board including a cage mounting area, the circuit board including a package mounting area remote from the cage mounting area;

an electronic package mounted to the circuit board at the package mounting area;

a receptacle cage mounted to the circuit board at the cage mounting area, the receptacle cage includes cage walls defining a first module channel, a second module channel stacked above the first module channel, and a third module channel stacked above the second module channel, the receptacle cage extending between a front end and a rear end, the cage walls including a top wall, a first side wall, a second side wall, a first separator panel, and a second separator panel, the first side wall extending along the first, second and third module channels, the second side wall extending along the first, second and third module channels, the first separator panel located between the first and second module channels, the second separator panel located between the second and third module channels;

a first receptacle module in the first module channel for mating with a first plug module, the first receptacle module being electrically connected to the circuit board, the first receptacle module being mounted to the circuit board within the cage mounting area;

a second receptacle module in the second module channel for mating with a second plug module, the second receptacle module being electrically connected to the circuit board; and a third receptacle module in the third module channel for mating with a third plug module, the third receptacle module being electrically connected to the circuit board at a connection area remote from the cage mounting area by one or more cables.

22. The communication system of claim 21, wherein the connection area is located closer to the package mounting area than the cage mounting area such that the cables are terminated to the circuit board in closer proximity to the electronic package than the first receptacle module.

23. The communication system of claim 21, wherein the second receptacle module is mounted to the circuit board within the cage mounting area.

24. The communication system of claim 21, wherein the first receptacle module is a first board module and the second receptacle module is a second board module stacked above the first board module, the first and second board modules having first and second contacts, respectively, configured to be terminated to the circuit board interior of a footprint of the receptacle cage within the cage mounting area, the third receptacle module being a cable module having third contacts terminated to ends of the one or more cables extending from the cable module exterior of the receptacle cage.

* * * * *